United States Patent [19]

Westerberg

[11] Patent Number: 5,620,624
[45] Date of Patent: Apr. 15, 1997

[54] COOKING METHOD AND APPARATUS CONTROLLING COOKING CYCLE

[75] Inventor: Eugene R. Westerberg, Palo Alto, Calif.

[73] Assignee: Quadlux, Inc., Fremont, Calif.

[21] Appl. No.: 393,259

[22] Filed: Feb. 23, 1995

Related U.S. Application Data

[63] Continuation of Ser. No. 65,655, May 21, 1993, abandoned, which is a continuation-in-part of Ser. No. 738,207, Jul. 30, 1991, abandoned, which is a continuation-in-part of Ser. No. 350,024, May 12, 1989, Pat. No. 5,036,179, which is a continuation-in-part of Ser. No. 195,967, May 19, 1988, abandoned.

[51] Int. Cl.$^6$ .................................................. H05B 3/02
[52] U.S. Cl. ..................... 219/411; 219/492; 219/412; 99/333; 426/523
[58] Field of Search .................................. 219/411, 400, 219/399, 412, 413, 405, 391, 492, 494; 392/416; 99/333, 328, 467, 468; 426/523, 241, 243, 248

[56] References Cited

U.S. PATENT DOCUMENTS

| | | | |
|---|---|---|---|
| 2,864,932 | 12/1958 | Forrer | 219/35 |
| 3,037,443 | 6/1962 | Newkirk et al. | 99/332 |
| 3,304,406 | 2/1967 | King | 219/411 |
| 3,313,917 | 4/1967 | Ditzler et al. | 219/400 |
| 3,326,692 | 6/1967 | Martino | 99/325 |
| 3,364,338 | 1/1968 | Holtkamp | 219/413 |
| 3,569,656 | 3/1971 | White et al. | 219/10.55 B |
| 3,699,307 | 10/1972 | Malkin | 219/492 |
| 3,751,632 | 8/1973 | Kauranen | 219/413 |
| 3,828,163 | 8/1974 | Amagami et al. | 219/413 |
| 4,379,964 | 4/1983 | Kanazawa et al. | 219/492 |
| 4,410,779 | 10/1983 | Weiss | 219/10.55 B |
| 4,421,974 | 12/1983 | Oota et al. | 219/492 |
| 4,463,238 | 7/1984 | Tanabe | 219/10.55 B |
| 4,481,405 | 11/1984 | Malick | 219/405 |

(List continued on next page.)

FOREIGN PATENT DOCUMENTS

| | | | |
|---|---|---|---|
| 0215617 | 9/1986 | European Pat. Off. | H05B 3/44 |
| 2546106 | 4/1977 | Germany | A47J 37/06 |
| 3503648 | 4/1986 | Germany . | |
| 59-47302 | 3/1984 | Japan | 219/405 |
| 1273023 | 5/1972 | United Kingdom . | |
| 2132060 | 8/1983 | United Kingdom | H05B 3/74 |
| 2132060 | 6/1984 | United Kingdom . | |
| 2152790 | 8/1985 | United Kingdom . | |

OTHER PUBLICATIONS

Fostoria Corporation, "Heat Processing with Infrared", Feb., 1962, pp. 1–7.
Summer, W. Dr., "Ultra–Violet and Infra–Red Engineering", 1962, pp. 102–112.
Beggs, E.W., "Quicker Drying with Lamps", Jul., 1939, vol. 97, No. 7, pp. 88–89.
Harold McGee, Book, "On Food and Cooking", Charles Schribner's Sons, New York, 1984, Chapter 14, pp. 608–624.

Primary Examiner—John A. Jeffery
Attorney, Agent, or Firm—Limbach & Limbach; George C. Limbach

[57] ABSTRACT

An oven for cooking a food item with radiant energy typically having a significant portion of radiant energy in the visible light range of the electromagnetic spectrum is disclosed. The desired cooking time for the given food item is set in or already stored in the oven controller, and radiation is initiated for cooking the food item for that desired cooking time. At a given time before the end of the desired cooking time, a signal is triggered indicating that a determination must be made as to whether the food item is cooked to the desired degree. Once the food item is cooked to the desired degree, the radiation is either stopped before the end of the desired cooking time, terminated at the end of desired cooking time or maintained beyond the desired cooking time. The previously set or stored cooking time may also be automatically reduced by the amount of time the actual cooking time was shortened from the stored cooking time or by the amount of time the actual cooking time was extended beyond the stored cooking time.

7 Claims, 5 Drawing Sheets

U.S. PATENT DOCUMENTS

| | | | |
|---|---|---|---|
| 4,486,639 | 12/1984 | Mittelsteadt | 219/10.55 B |
| 4,516,486 | 5/1985 | Burkhart | 99/388 |
| 4,554,437 | 11/1985 | Wagner et al. | 219/388 |
| 4,575,616 | 3/1986 | Bergendal | 219/405 |
| 4,601,004 | 7/1986 | Holt et al. | 99/328 |
| 4,687,895 | 8/1987 | Chitre et al. | 219/10.55 B |
| 4,700,051 | 10/1987 | Goessler et al. | 219/464 |
| 4,731,251 | 3/1988 | Jovanovic | 426/243 |
| 4,761,529 | 8/1988 | Tsisios | 219/10.55 B |
| 4,976,194 | 12/1990 | Kelterborn et al. | 99/328 |
| 5,134,263 | 7/1992 | Smith et al. | 99/325 |
| 5,171,974 | 12/1992 | Koether et al. | 219/413 |
| 5,179,265 | 1/1993 | Sheridan et al. | 219/492 |
| 5,317,130 | 5/1994 | Burkett et al. | 219/492 |
| 5,319,171 | 6/1994 | Tazawa | 219/705 |
| 5,352,865 | 10/1994 | Burkett et al. | 219/492 |
| 5,378,872 | 1/1995 | Jovanovic | 219/405 |
| 5,517,005 | 5/1996 | Westerberg et al. | 219/405 |

COOKING METHOD AND APPARATUS CONTROLLING COOKING CYCLE

RELATED APPLICATIONS

This is a continuation of application Ser. No. 08/065,655, filed on May 21, 1993, now abandoned, which application is a continuation-in-part of application Ser. No. 07/738,207, filed Jul. 30, 1991, now abandoned, which was a continuation-in-part of application Ser. No. 07/350,024, filed May 12, 1989, now U.S. Pat. No. 5,036,179 which was in turn a continuation-in-part of application Ser. No. 07/195,967, filed May 19, 1988, now abandoned.

FIELD OF THE INVENTION

This invention relates to cooking method and apparatus for controlling cooking cycle and particularly to method and apparatus for automatically adjusting the cooking cycle of a designated recipe.

BACKGROUND OF THE INVENTION

Ovens having linear sources of visible and infrared radiant energy are disclosed and described in U.S. Pat. No. 5,036,179 and U.S. patent application Ser. No. 07/738,207 which are incorporated herein by reference. These ovens provide high-speed, high-quality cooking and baking of food items by impinging high-intensity visible, near-visible, and infrared radiations onto a food item. The ovens cook the food items within the short periods of time normally found in microwave cooking while maintaining the browning of infrared cooking and the quality of conduction-convection cooking. When food is exposed to a sufficiently intense source of visible, near-visible, and infrared radiation, the food absorbs low levels of visible and near-visible radiation, thereby allowing the energy to penetrate the foodstuff and heat it deeply. The longer infrared radiation does not penetrate deeply but acts as an effective browning agent.

Ordinarily, the source of the visible, near-visible and infrared radiation used with the present invention is in excess of two quartz-halogen tungsten lamps, or equivalent means such as quartz arc lamps. Typical quartz-halogen lamps of this type operate at 3000 degrees Kelvin and convert electrical energy into black body radiation having a range of wavelengths from 0.4 μm to 4.5 μm with a peak intensity at 0.965 μm. Each lamp can generally provide about 2 KW of radiant energy with a significant portion of the energy in the visible light spectrum.

The ovens can use a plurality of these lamp or an array of several lamps either operated in unison or selectively operated in varying combinations as necessary for the particular food item sought to be cooked. These radiation sources are ordinarily positioned above and below the food item. The walls of the surrounding food chamber are preferably made from highly reflective surfaces. The visible and infrared waves from the radiation sources impinge directly on the food item and are also reflected off the reflected surfaces and onto the food item from many angles. This reflecting action improves uniformity of cooking. The speed of cooking makes it possible to monitor the cooking process and select the precise instant to terminate the cooking process.

The cooking energy applied and the cooking speed of these ovens makes it critical to cook the food item the appropriate length of time to achieve the desired degree of cooking because in a short period of cooking time the food item can go from undercooked to overcooked condition.

SUMMARY OF THE INVENTION

The present invention is directed to method and apparatus for cooking a food item with radiant energy and typically using a significant portion of radiant energy in the visible light range of the electromagnetic spectrum wherein the desired cooking time for the given food item is set in or already stored in the oven controller and radiation is initiated for cooking the food item for that desired cooking time. A signal is triggered at a given time before the end of the desired cooking time when a determination needs to be made if the food item is cooked to the desired degree. Then at a point in time when the food item is cooked to the desired degree the radiation is either stopped before the end of the desired cooking time, terminated at the end of desired cooking time or maintained beyond the desired cooking time.

With this invention the cooking time can be easily adjusted to varying conditions which may or may not be predictable and to permit ready adjustment to the taste of different individuals.

In accordance with another aspect of this invention, the previously set or stored cooking time can be automatically changed from the previously stored cooking time by the amount of time the actual cooking time was shortened from the stored cooking time or by the amount of time the actual cooking time was extended beyond the stored cooking time.

Thus, the oven operator will not have to remember to insert a new cooking time the next time that same food item is cooked.

The invention and its features will be better understood after a perusal of the following specification taken in conjunction with the accompanying drawings wherein similar characters of reference refer to similar parts in each of the several views.

DETAILED DESCRIPTION OF THE PREFERRED EMBODIMENT

Figure 1:
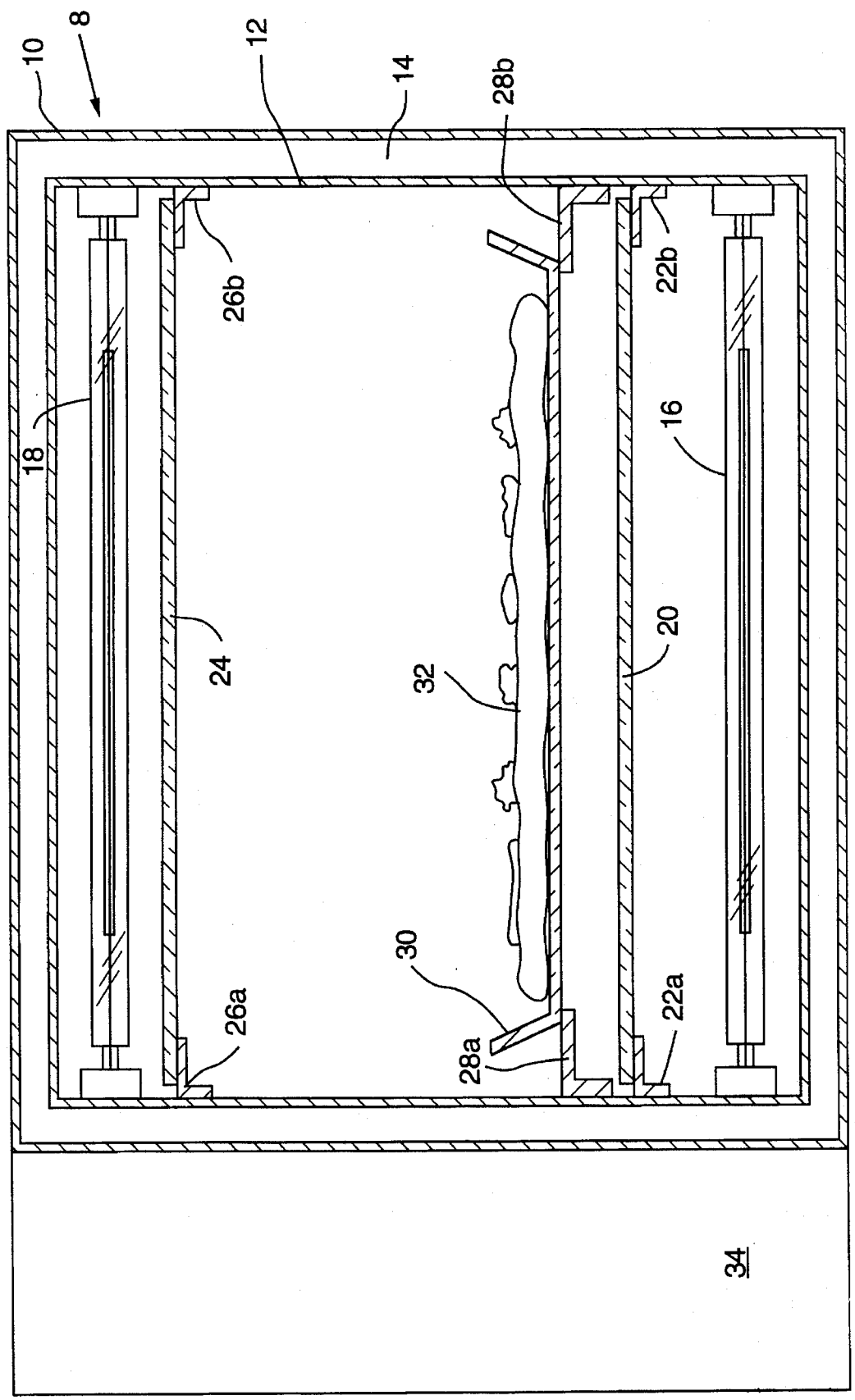
FIG. 1 shows a schematic front elevational view of one oven embodying the overall features of the present invention with the front door removed.
Figure 2:
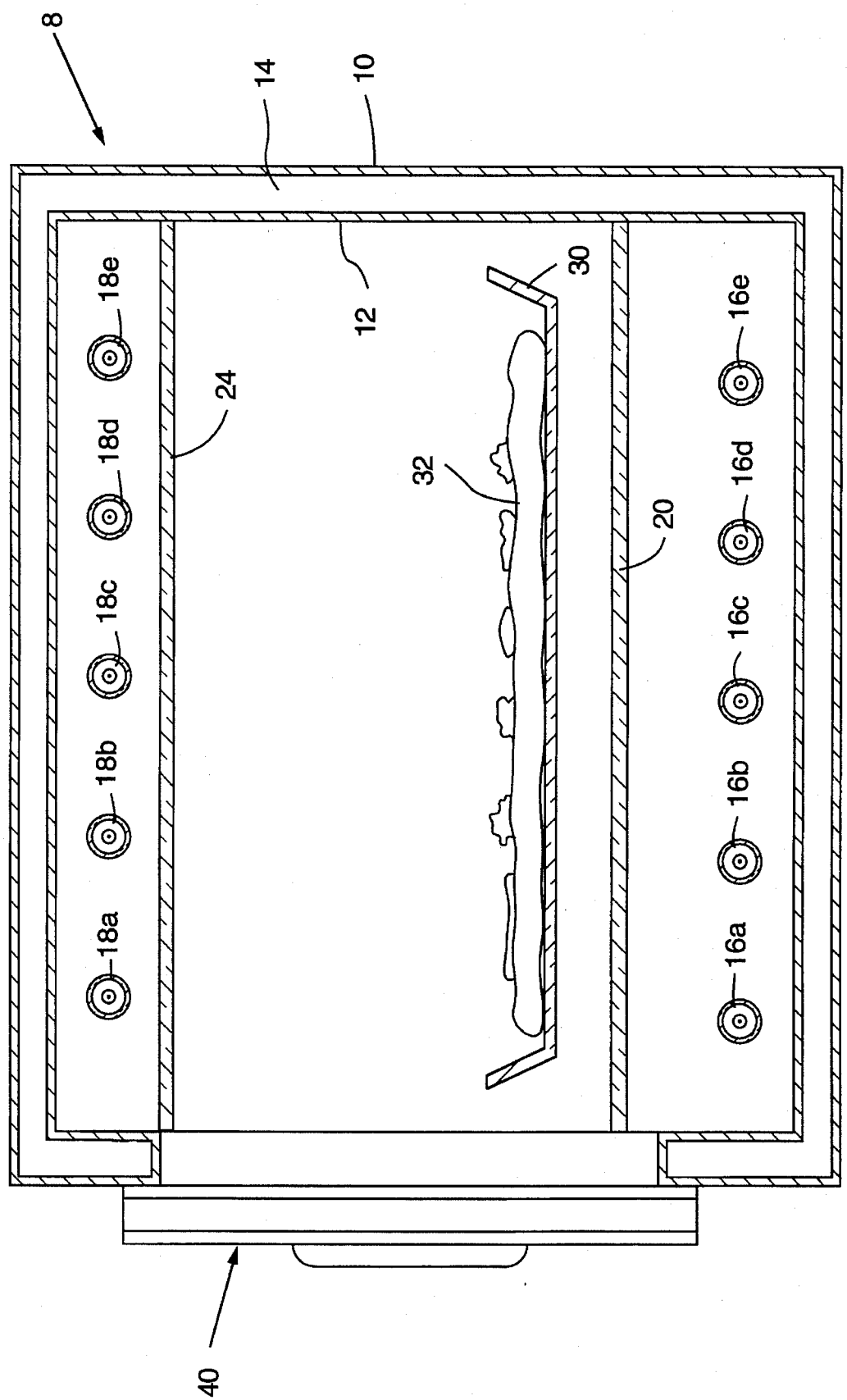
FIG. 2 shows a side elevational sectional view of the structure shown in FIG. 1.
Figure 3:
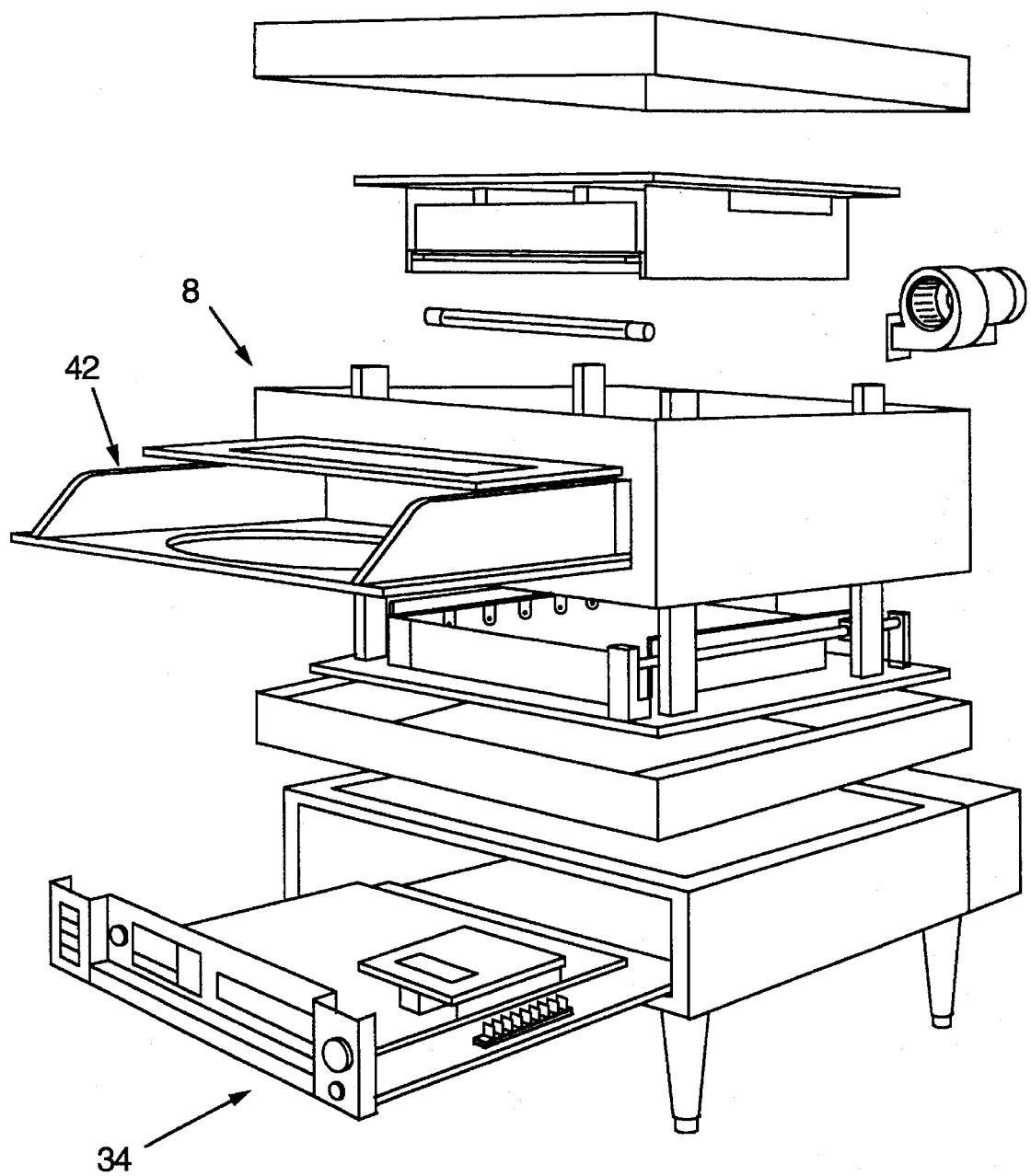
FIG. 3 is an exploded view of a preferred embodiment of the present invention.

Referring now to the drawing with particular reference to FIGS. 1–3, there is shown an oven 8 constructed for operation in accordance with the present invention. The oven 8 includes an outer enclosure 10 and an inner wall 12 coupled thereto typically with insulation 14 formed therebetween. Because of the inherent speed of the cooking cycle, the insulating layer 14 may be a layer of air.

The energy for cooking is supplied by a plurality of lower radiant heating lamps 16 and upper radiant heating lamps 18. These lamps are preferably quartz-halogen tungsten lamps which are capable of producing up to approximately 2 KW of radiant energy with a significant portion of the light energy in the visible light spectrum. When illuminated, the lighted portion of the preferred lamp has a length of approximately 10 inches.

The inner surface of the inner wall 12 is preferably a highly polished metal, such as aluminum or stainless steel, which is very reflective to the wide spectrum of wavelengths from the radiant lamps. The oven has a door 40 which also has a reflective inner surface.

Two radiation transparent plates 20 and 24 are used to isolate the cooking chamber from the radiant lamps, making the oven easier to clean. These plates can be formed from materials, such as high quality heat-resistant glasses or ceramics that are transparent to visible, non-visible and infrared radiations. The lower transparent plate 20 is supported by brackets 22a and 22b and is positioned above the lower lamps 16. The upper transparent plate 24 is supported by brackets 26a and 26b and is positioned below upper lamps 18.

In the embodiment of FIGS. 1 and 2, there are 5 lower lamps 16a through 16e and 5 upper lamps 18a though 18e. By appropriately selecting the lateral spacing between the lamps relative to the food, even cooking can be achieved over the entire surface. Uniformity can be enhanced by rotating the food item and by arranging the lamps such that during the cooking cycle all regions of the food surface receive equivalent amounts of energy from the lamps.

Brackets 28a and 28b support a platter 30. The platter 30 is positioned above the lower transparent plate 20 and below the upper glass plate 24. A food item 32 is positioned on platter 30 to be cooked or can be positioned on a grill.

The control circuit 34 shown in a circuit block controls operation of the lamps 16 and 18. It is possible to control the lamps 16 and 18 independently with the control circuit. The control circuit 34, may include a microprocessor or a microcontroller and associated memory to store individual cooking recipes to control proper heating of the food product. For example, in cooking a pizza, it may be desirable to run the upper lamps 18 at a reduced power level for a time. For pizza having fresh vegetables, this would prevent the overcooking of the vegetable making them mushy. A door 40 is shown closing off the front of the oven.

FIG. 3 shows an exploded version of another model and a preferred embodiment of the present invention wherein the elements described with respect to FIGS. 1 and 2 are identified by similar numbers. This embodiment of the invention includes a drawer 42 which can slide in and out of the oven 8 and has an aperture for rotatably positioning a grill (not shown). There are five upper lamps and five lower lamps but the lamps are positioned asymmetrically with respect to a midline of the cooking location so as to cook substantially uniformly over a large cooking area that has a transverse dimension or radius longer than the length of the lamps. The controls 34 include a microcontroller and associated memory along with keys to enter and store a program which controls the light operation, for example in terms of time and intensity, for a variety of different food types.

Figure 4:
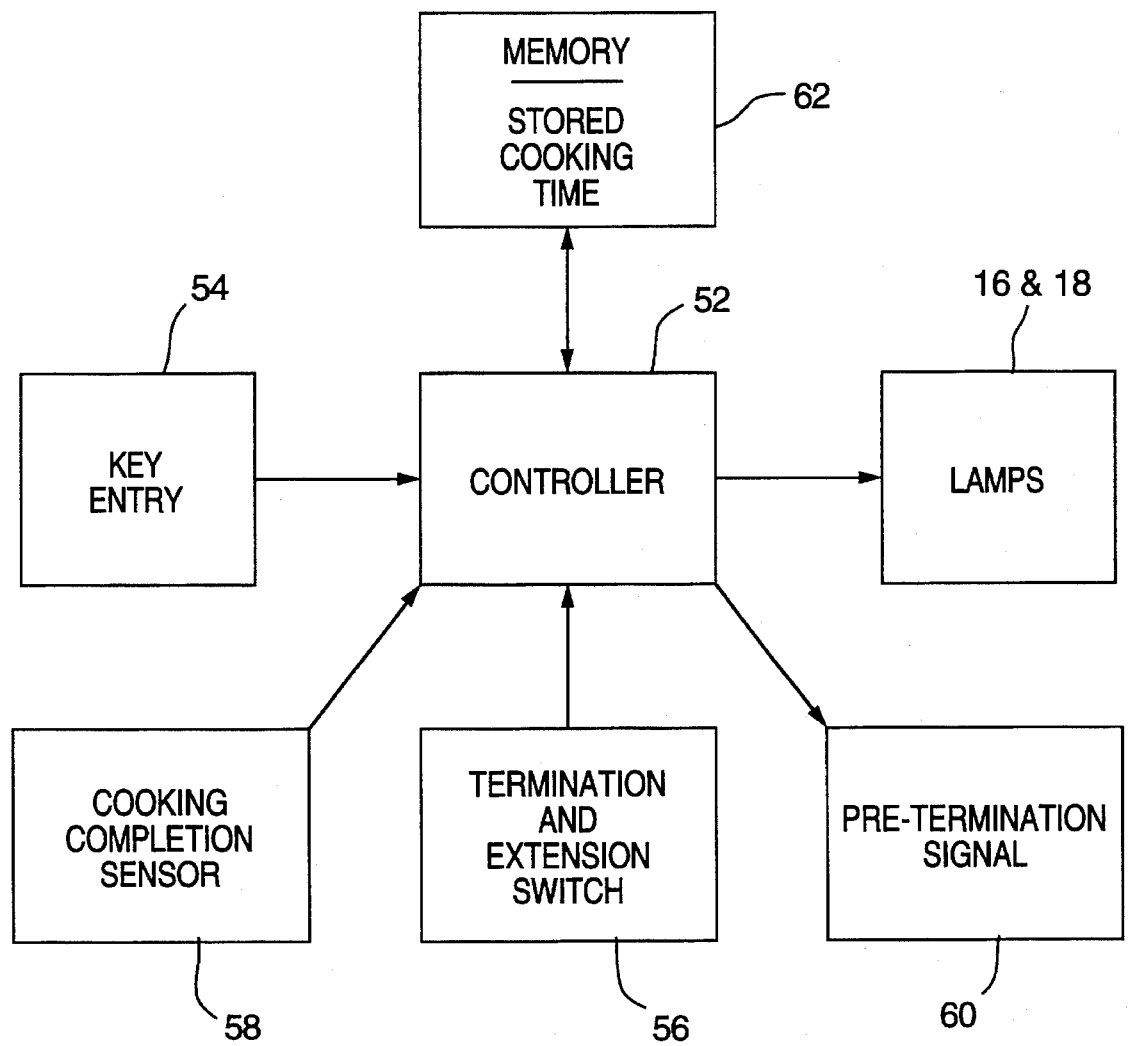
FIG. 4 is a schematic block diagram view illustrating other features of the present invention.

FIG. 4 shows a schematic block diagram of the control circuit 34 including a controller 52 provided with an input keyboard or keypad 54 for setting the controls of lamp operation in terms of time and intensity for a variety of different food types. Once the cooking time for a given food item is programmed into the controller, it can be retrieved and actuated for the same food item in the future.

The control system includes a cooking cycle termination or extension switch 56 for varying the duration of the cooking cycle. Switch 56 can be hand-operated or electronically controlled by a sensor 58, such as a sensor which determines the temperature of the food being cooked and when the food has been cooked to the desired degree.

A pretermination signal generator 60, either audio and/or visual, is connected to the controller to be triggered within a given time, such as ten seconds, before the end of the preset desired cooking time held in memory 62.

The termination or extension switch 56 can take several forms, either one or two switches, but is preferably a switch which when depressed during the cooking cycle when the lamps are on will, when released, turn the lamps off. Thus, when the pretermination signal is triggered, the user can depress the switch 56 and determine when the food item has been cooked to a desired state, such as either by visual observation of the food being cooked through a window in the door 42 or from the sensor 58, and upon release of the switch 56, the lamps will be turned off. If the switch 56 is released before the end of the programed desired cooking time, the cooking time will be shortened. If the switch is maintained depressed beyond the end of the desired cooking time stored in the memory, the lamps will stay on until the switch is released. The controller will provide an indication of the time, such as in numbers of seconds, by which the cooking time has been shortened or extended.

The controller can be set automatically to change the stored cooking time by the amount of time the stored time has been foreshortened or extended or can operate to maintain the original stored cooking time unless the operator makes an entry on the keypad 54 to then automatically make the change in the originally stored desired cooking time.

Figure 5:
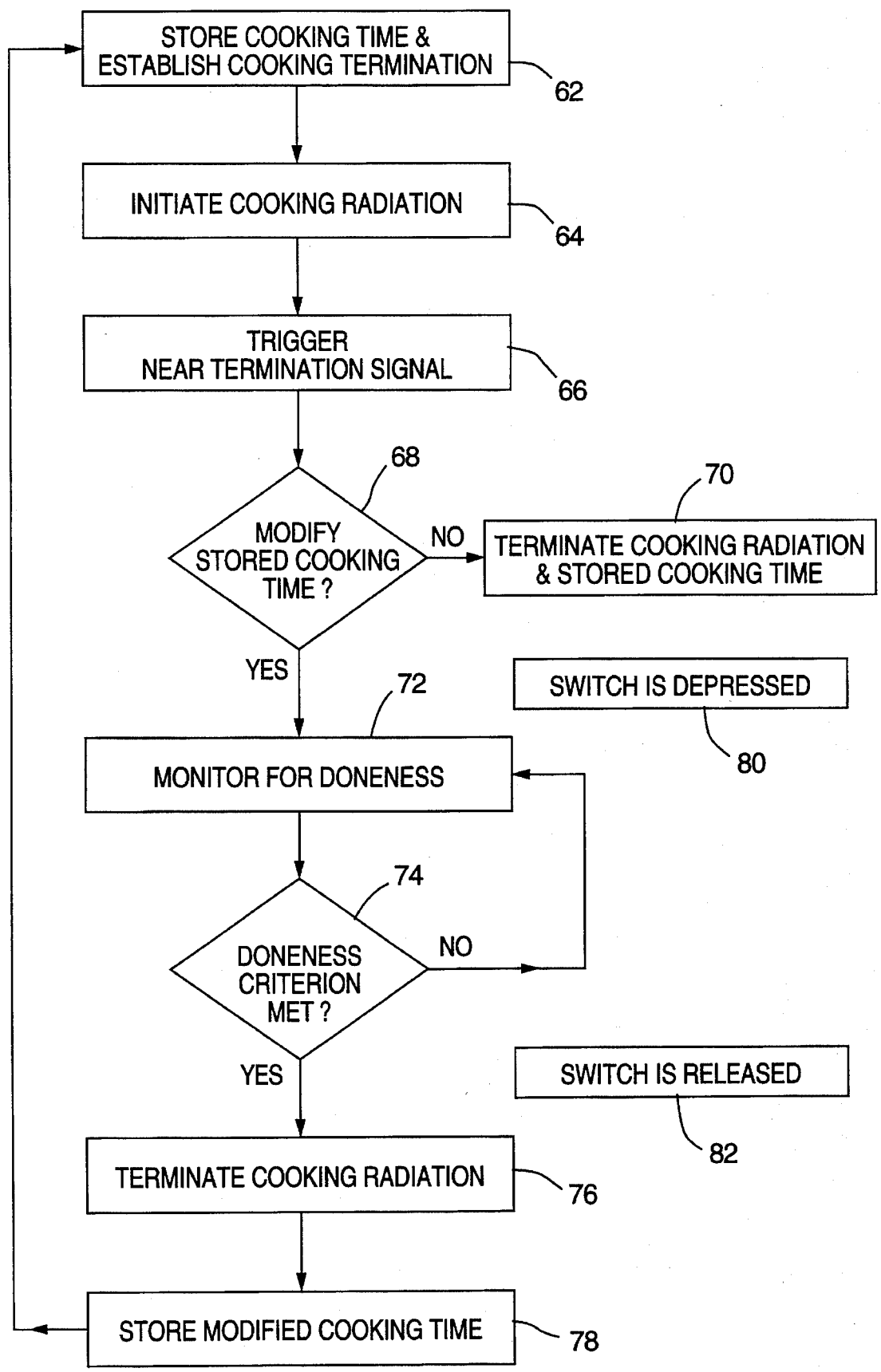
FIG. 5 is a flow chart diagraming the control logic of the method of the present invention.

FIG. 5 is a flow chart diagramming the control logic utilizing the present invention. Initially, the cooking time for the particular variety of food and other operational characteristics of the oven such as the number and intensity of the lamps, is stored and thereby establishes the cooking termination as designated 62. Initiation of the cooking radiation is commenced as at 64 thereby to count down to the cooking termination from the stored cooking time. At a specified time, such as 10 seconds, before the end of the preset desired cooking time, a near termination signal is triggered at 66. At this time, the decision is made whether to modify the stored cooking time at 68. If no modification in the cooking time is to be made, the lamps 16 and 18 are turned off stopping radiation to the food to terminate cooking radiation at the stored cooking time as at 70. If the decision is to modify the stored cooking time, the food is monitored for doneness such as visually such as for determining the temperature of the food being cooked. Next, determination is made whether doneness criterion is met as at 74, which if not necessitates further monitoring but which if the criteria has been met initiated termination of cooking radiation as at 76. Thus, termination can occur prior to at the same time as or subsequent to the previously established cooking termination from the stored cooking time. If desired, the resultant cooking time can be stored at 78 or used to change the stored cooking time 62. In utilizing the single switch which is described as depressed to modify the stored cooking time and is released to then terminate cooking radiation, the switch is shown depressed at 80 and released at 82.

Alternative constructions and operations of the present invention will be readily apparent to a person's skill in the art, and the present invention is only limited by the scope of the appended claims.

What is claimed:

1. A method of cooking a food item with radiant energy typically having a significant portion of the radiant energy in the visible light range of the electromagnetic spectrum comprising the steps of:

a. storing the desired cooking time for the given food item, b. initiating radiation of the radiant energy on the food item for said desired cooking time, c. triggering a signal within a predetermined time before the end of said desired cooking time, d. after triggering the signal activating a new cooking time termination sequence, and e. then stopping the radiation at a point in time when the food item is cooked to the desired degree.

2. The method of claim 1 including the step of changing said stored cooking time for the given food item to the time taken to cook the food to the desired degree.

3. An apparatus for cooking a food item with radiant energy typically having a significant portion of the radiant energy in the visible light range of the electromagnetic spectrum comprising the steps of:

a. means for storing the desired cooking time and for establishing termination of cooking for the given food item, b. means for initiating radiation of the radiant energy on the food item for said desired cooking time and for counting down to the termination of cooking the given food item, c. means for triggering a signal within a predetermined time before termination of cooking radiation at the end of said stored desired cooking time, and d. means operable at least after triggering of said triggering means for terminating the radiation at a new cooking time when the food item is cooked to the desired degree.

4. The apparatus of claim 3 including means for automatically changing said stored cooking time to said new cooking time.

5. The apparatus of claim 4 wherein said terminating means includes first switching means for disabling termination of cooking radiation at said stored desired cooking time and second switching means for terminating the radiation at the end of said new cooking time.

6. An apparatus for cooking a food item with radiant energy typically having a significant portion of the radiant energy in the visible light range of the electromagnetic spectrum comprising the steps of:

a. means for storing the desired cooking time and for establishing termination of cooking for the given food item, b. means for initiating radiation of the radiant energy on the food item for said desired cooking time and for counting down to the termination for cooking the given food item, c. means for triggering a signal within a given time before termination of cooking radiation at the end of said stored desired cooking time, d. means operable at least after triggering of said triggering means for terminating the radiation at a new cooking time when the food item is cooked to the desired degree, and e. said terminating means including a push and release switch connected such that pushing said switch disables termination of cooking radiation at said stored desired cooking time and releasing said pushed switch terminates the cooking radiation at the end of said new cooking time.

7. The apparatus of claim 6 including means for automatically changing said stored cooking time to said new cooking time.

* * * * *